United States Patent
Jamshidi et al.

(10) Patent No.: US 11,327,340 B2
(45) Date of Patent: May 10, 2022

(54) FEMTOPROJECTOR OPTICAL SYSTEMS WITH SURROUNDING GROOVES

(71) Applicant: Tectus Corporation, Saratoga, CA (US)

(72) Inventors: Babak Jamshidi, Menlo Park, CA (US); Flint Orin Hamblin, Saratoga, CA (US); Brian Elliot Lemoff, Morgan Hill, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 219 days.

(21) Appl. No.: 16/783,026

(22) Filed: Feb. 5, 2020

(65) Prior Publication Data

US 2020/0271957 A1    Aug. 27, 2020

Related U.S. Application Data

(60) Provisional application No. 62/809,246, filed on Feb. 22, 2019.

(51) Int. Cl.
  *G02C 7/04*    (2006.01)
  *G02B 27/00*   (2006.01)
  *G02C 7/14*    (2006.01)

(52) U.S. Cl.
  CPC .......... *G02C 7/04* (2013.01); *G02B 27/0093* (2013.01); *G02C 7/14* (2013.01)

(58) Field of Classification Search
  CPC ... G02C 7/04; G02C 7/14; G02C 7/02; G02C 7/10; G02C 7/104; G02B 27/0093; G02B 27/0101

USPC ............... 351/219, 159.02, 159.24
See application file for complete search history.

(56) References Cited

U.S. PATENT DOCUMENTS

| | | | |
|---|---|---|---|
| 4,239,392 A * | 12/1980 | Pohle | G01J 9/00 356/521 |
| 4,711,512 A | 12/1987 | Upatnieks | |
| 5,638,218 A | 6/1997 | Oomura | |
| 5,638,219 A | 6/1997 | Medina Puerta | |

(Continued)

FOREIGN PATENT DOCUMENTS

GB    1216075 A    12/1970

OTHER PUBLICATIONS

Song et al "Baffles design for the axial two-mirror telescope", Optical Engineering, 2002, vol. 41, No. 9, pp. 2353-2357.

(Continued)

*Primary Examiner* — William R Alexander
(74) *Attorney, Agent, or Firm* — Fenwick & West LLP

(57) ABSTRACT

A variety of femtoprojector optical systems are described. The optical bodies for the systems may be made in batches by wafer-level optics. Each individual system may be made small enough to fit in a contact lens. In some designs, the optical systems include a solid transparent body with a curved primary mirror, a secondary mirror, an entrance window, an exit window, and at least one groove. The grooves function as a light trap that reduces the amount of stray light exiting the body of the optical system. The grooves may also create a snap point which allows removal of individual bodies from the wafer through controlled breakage. The designs may also include various light blocking, light-redirecting, absorbing coatings, or other types structures to reduce stray light.

20 Claims, 11 Drawing Sheets

(56) References Cited

U.S. PATENT DOCUMENTS

| | | | |
|---|---|---|---|
| 6,560,039 B1 | 5/2003 | Webb | |
| 8,134,778 B2 | 3/2012 | Guyer | |
| 8,571,789 B2 | 10/2013 | Monde | |
| 8,764,185 B1 * | 7/2014 | Biederman | G02C 7/04 |
| | | | 351/159.02 |
| 9,063,352 B2 | 6/2015 | Ford | |
| 9,111,473 B1 | 8/2015 | Ho | |
| 9,134,534 B2 | 9/2015 | Border | |
| 9,251,745 B2 | 2/2016 | Sprague | |
| 9,465,988 B1 * | 10/2016 | Marason | G06K 9/00604 |
| 2002/0140906 A1 | 10/2002 | Gibbon | |
| 2005/0180687 A1 | 8/2005 | Amitai | |
| 2009/0185135 A1 * | 7/2009 | Volk | G02B 17/086 |
| | | | 351/219 |
| 2009/0189830 A1 | 7/2009 | Deering | |
| 2010/0033561 A1 | 2/2010 | Hersee | |
| 2011/0176205 A1 | 7/2011 | Shaw | |
| 2011/0221659 A1 | 9/2011 | King, III | |
| 2013/0278631 A1 | 10/2013 | Border | |
| 2014/0098226 A1 | 4/2014 | Pletcher | |
| 2014/0118829 A1 | 5/2014 | Ma | |
| 2015/0234195 A1 * | 8/2015 | Honea | G02B 19/0023 |
| | | | 359/618 |
| 2015/0301338 A1 | 10/2015 | Van Heugten | |
| 2015/0312560 A1 | 10/2015 | Deering | |
| 2016/0026253 A1 | 1/2016 | Bradski | |
| 2016/0097940 A1 | 4/2016 | Sako | |
| 2016/0150951 A1 | 6/2016 | Du | |
| 2017/0068097 A1 * | 3/2017 | Honea | G02B 27/1086 |
| 2018/0292626 A1 * | 10/2018 | Chou | G02B 13/0035 |
| 2019/0109998 A1 * | 4/2019 | Venkataraman | G06T 7/557 |
| 2019/0244557 A1 * | 8/2019 | Deering | G09G 3/32 |
| 2019/0250413 A1 * | 8/2019 | Martin | H04N 5/225 |
| 2019/0251893 A1 * | 8/2019 | Martin | G09G 3/32 |
| 2019/0324292 A1 * | 10/2019 | Tuan | G09G 3/02 |
| 2019/0331937 A1 * | 10/2019 | Owens | G02C 11/10 |
| 2019/0355512 A1 * | 11/2019 | Owens | H02J 50/10 |
| 2020/0037313 A1 * | 1/2020 | Winoto | G02C 11/10 |

OTHER PUBLICATIONS

Avago Technologies, "ADNS-2620 Optical Mouse Sensor Data Sheet," Mar. 27, 2008, 27 pages.

Peifu, G., "Design and Preparation of Quarter-Wave Plate Coatings," National Air Intelligence Center, May 12, 1995, 16 pages.

Tremblay, EJ, et al., "Ultrathin Cameras Using Annular Folded Optics," Applied Optics, Feb. 2007, vol. 46, No. 4. pp. 463-471.

PCT International Search Report and Written Opinion, PCT Application No. PCT/US17/57240, dated Jan. 12, 2018, 23 pages.

"8.2 All-Reflecting Two-Mirror Telescopes," Datasheet telescope-optics, telescope-optics.net, Aug. 3, 2016, 4 pages, [Online] [Retrieved on Dec. 14, 2017] Retrieved from the Internet<URL: https://web.archive.Org/web/20160803183105/http://www.telescope-optics.net/two-mmirror.htm>.

All-Reflecting Two-Mirror Telescopes, (Aug. 3, 2016), URL: https://web.archive.org/web/20160803183105/ http://www.telescope-optics.net/two-mirror.htm, (Dec. 14, 2017) (5 pages).

\* cited by examiner

FEMTOPROJECTOR OPTICAL SYSTEMS WITH SURROUNDING GROOVES

CROSS-REFERENCE TO RELATED APPLICATION(S)

This application claims priority under 35 U.S.C. § 119(e) to U.S. Provisional Patent Application Ser. No. 62/809,246, "Femtoprojector Optical Systems," filed Feb. 22, 2019. The subject matter of all of the foregoing is incorporated herein by reference in their entirety.

BACKGROUND

1. Technical Field

This disclosure relates generally to projectors for eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the contact lens. The projector must be very small to fit in the contact lens. The projector is so small that, for convenience, Deering called it a "femtoprojector". A typical femtoprojector preferably is no larger than about one or two millimeters in any dimension.

Eye-mounted displays can be used for both virtual and augmented reality applications. In virtual reality applications, the images projected by the eye-mounted display replace what the user would normally see as her external environment. In augmented reality applications, the images projected by the eye-mounted display augment what the user would normally see as her external environment, for example they may appear as additions to the external environment.

The femtoprojectors in an eye-mounted display include an image source and an optical system. A femtoprojector's optical system is designed to project images from the image source onto the retina so that the images appear in a person's field of vision. The femtoprojector optical systems are constrained to fit inside a contact lens while also providing sufficient image quality.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

Figure 1A:
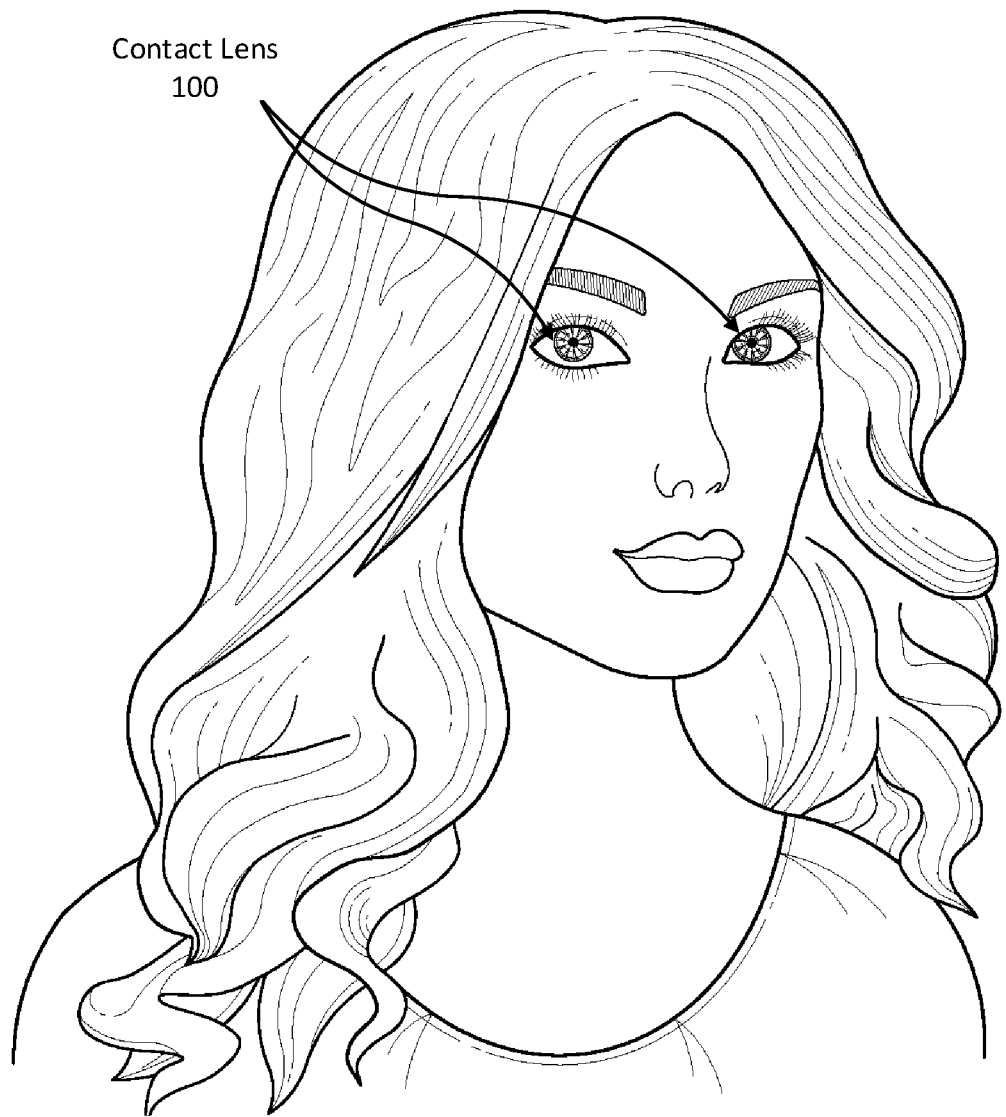
FIG. 1A shows a person wearing contact lens displays.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one application, femtoprojector optical systems project images from an image source that is inside a contact lens onto a user's retina. These femtoprojector optical systems are small enough to fit inside a contact lens. They may be made with practical manufacturing processes and may be designed to provide high-quality images on a person's retina.

In one class of designs, the optical systems include a solid, transparent body (or core) with a primary mirror formed on one surface of the body and a secondary mirror formed on an opposing surface of the body. A central entrance window is formed on the same surface as the primary mirror and positioned opposite the secondary mirror. An annular exit window is formed on the same surface as the secondary mirror. Light enters the solid core through the entrance window, is reflected by the two mirrors and exits the core through the exit window. Light projected from the optical systems onto the retina may create an image on the wearer's retina as part of an augmented reality or virtual reality system.

If stray light escaped from a femtoprojector it could reduce image contrast. As such, some femtoprojectors may include groove(s) in the solid core, where the grooves form a light trap to reduce the amount of stray light that exits the optical system. Groove(s) may also be used to create areas of weaker mechanical strength, for example so that a wafer of solid cores may be separated into individual solid cores. Femtoprojector optical systems may include one, two, or more grooves. Different configurations may include grooves with dissimilar sizes, positions, and/or depths.

The solid bodies for a femtoprojector optical system may be formed with a plastic molding process or a precision lathe. As an example, the solid body may be molded from an optical plastic or cut from a rod of the plastic. The optical plastic may be, for example, poly(methyl methacrylate) or a cyclo-olefin polymer (e.g. Zeonex, Zeon Corp., Japan).

In some examples, the solid cores are further processed to add reflective and/or absorptive coatings. The absorptive coatings may be positioned on various surfaces of the optical system such that they assist in projecting light from the image source to the retina, and/or reduce the amount of stray light exiting the system. For example, a surface of a groove may be coated with an absorptive coating such that stray rays incident on the groove are attenuated and do not exit the optical system.

Multiple solid cores may be formed in parallel using a wafer-based process. For example, a wafer containing multiple solid cores may be created by a wafer molding process. In another example, multiple solid cores may be systematically cut into an existing solid, optically-clear wafer substrate. The solid cores may be singulated into separate pieces by saw blade dicing, laser dicing, or snapping out along snap lines or curves. The solid cores may be coated with reflective or absorptive coating while still in wafer form, obviating tedious processing of individual cores.

Figure 1B:
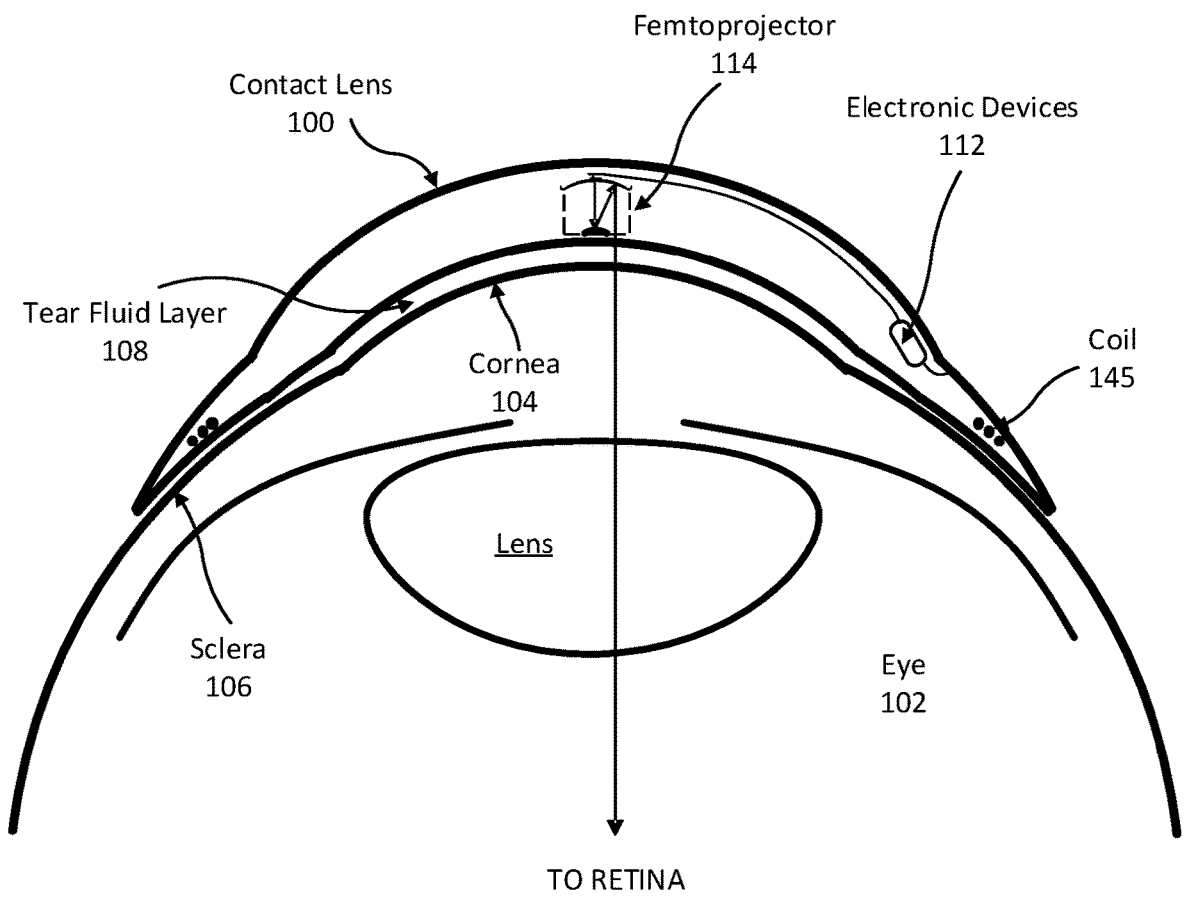
FIG. 1B shows a cross-section of a contact lens display mounted on a user's eye.

Further details for femtoprojectors are provided using an eye-mounted display as an example of an electronic contact lens, although femtoprojector optical systems may be used in other applications. FIG. 1A shows a user wearing a display mounted in a scleral contact lens 100. FIG. 1B shows a cross sectional view of the scleral contact lens 100 mounted on the user's eye 102. Scleral contact lenses are designed to not move around on the wearer's eye. The eye 102 includes a cornea 104 and a sclera 106. The scleral contact lens 100 is supported by the sclera 106. A tear fluid layer 108 may be formed between the contact lens 100 and the cornea 104. Oxygen permeates through the contact lens 100 to the cornea 104.

The contact lens 100 contains payload(s). For example, the payload(s) may include electronics, including electronics that require a power source such as a battery or a coil that is inductively powered. In the example of FIG. 1, the payloads include a small projector that projects images onto the wearer's retina (referred to as a femtoprojector 114), and the corresponding electronics 112 to operate the femtoprojector. These may be powered by the receiver coil 145, which is positioned around the periphery of the contact lens. The femtoprojector 114 may include an LED frontplane with an LED array, an ASIC backplane with electronics that receives the data to drive the LED frontplane, and optics to project light from the LED array onto the retina. The femtoprojector 114 fits into a 2 mm by 2 mm by 2 mm volume or, preferably, into a 1 mm by 1 mm by 1 mm volume.

The femtoprojector 114 is positioned over the cornea since it projects images onto the retina. The electronics 112 and coil 145 may be positioned away from the cornea, as shown in FIG. 1B. Other examples of powered payloads include sensors, imagers, and eye tracking components such as accelerometers, gyroscopes and magnetometers. Payloads may also include passive devices, such as a coil or antenna for wireless power or data transmission, capacitors and batteries for energy storage, and passive optical structures (e.g., absorbing light baffles, beam-splitters, imaging optics). The contact lens 100 may also contain multiple femtoprojectors, each of which projects images onto the user's retina.

Figure 2:
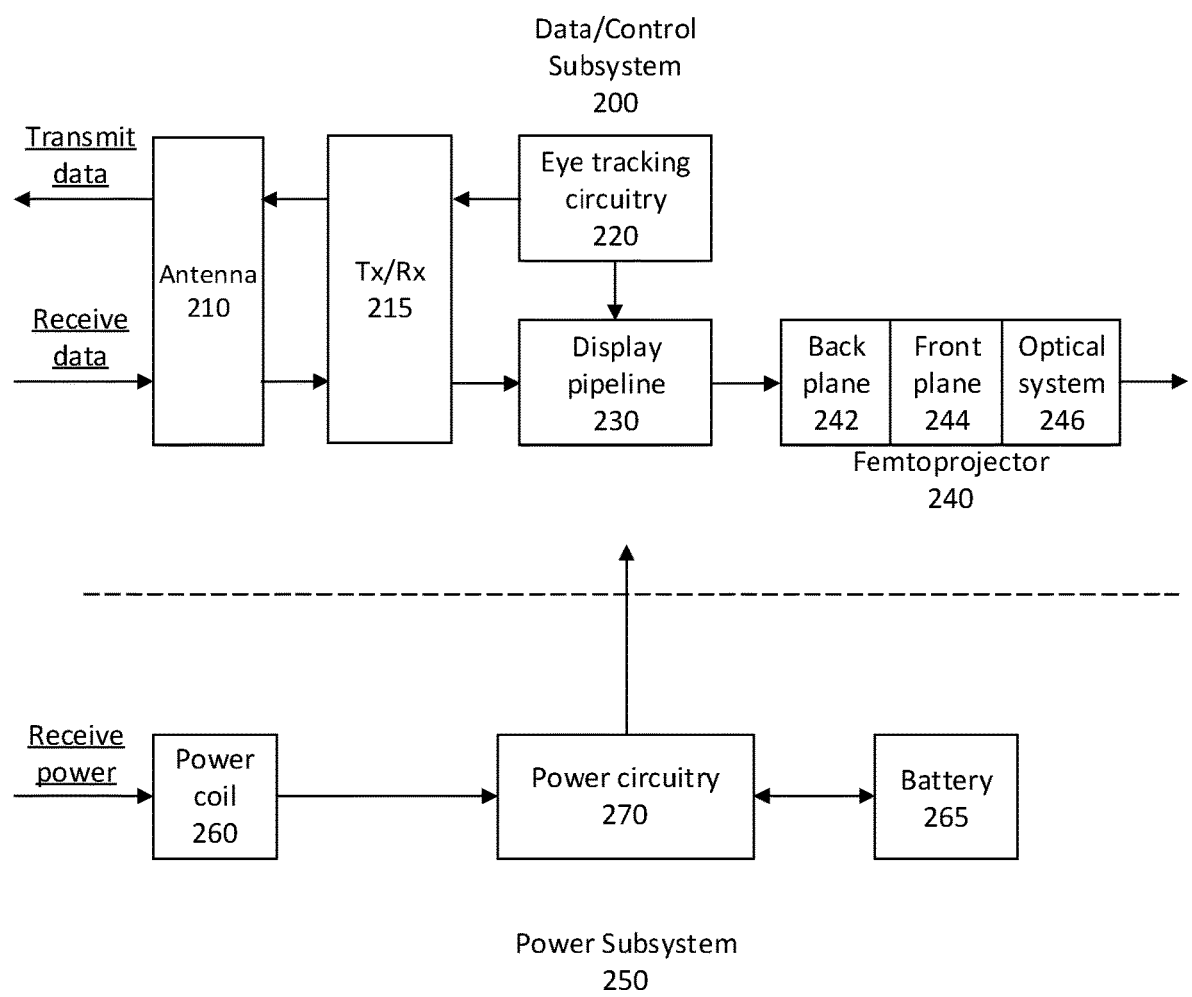
FIG. 2 shows a block diagram of an eye-mounted display including a femtoprojector optical system.

FIG. 2 is a functional block diagram of an eye-mounted display using the scleral contact lens including internal femtoprojectors described above. The display can be divided into a data/control subsystem 200 and a power subsystem 250.

In this example, the receive path of the data/control subsystem 200 includes an antenna 210, transmission and receiver circuitry 215, a display pipeline 230, and a femtoprojector 240. Data from an external source is wirelessly transmitted to the display and received via the antenna 210. The receiver ("Rx") circuitry 215 performs the functions for receiving the data, such as, for example, demodulation, noise filtering, and amplification. It also converts the received signals to digital form. The display pipeline 230 processes the digital signals for the femtoprojector 240. These functions may include decoding, and timing. The processing may also depend on other signals generated internally within the contact lens, such as, for example, eye tracking sensors 220 or ambient light sensing. The femtoprojector 240 then projects the corresponding images onto the wearer's retina. In this example, the femtoprojector 240 includes a CMOS ASIC backplane 242, LED frontplane 244 and optical system 246. Some examples of the femtoprojector optical system 246 are described below.

The data/control subsystem 200 may also include a back channel. As illustrated, the back channel transmits data through transmitter circuitry ("Tx") 215 and antenna 210. For example, the contact lens may transmit eye tracking data, control data and/or data about the status of the contact lens.

The power subsystem 250 receives power wirelessly via a power coil 260. This is coupled to power circuitry 270 that conditions and distributes the incoming power (e.g., converting from AC to DC if needed). The power subsystem 250 may also include energy storage devices, such as batteries 265 or capacitors.

In addition to the components shown in FIG. 2, the overall system may also include components that are outside the contact lens (i.e., off-lens). There are many ways to implement the different system functions. Some portions of the system may be entirely external to the user, while other portions may be worn by the user in the form of a headpiece or glasses. Components may also be worn on a belt, armband, wrist piece, necklace, or other types of packs. In other examples, the components may be in devices or structures near the user (e.g., the wall of a room, a tabletop data transmission system, etc.).

Figure 3:
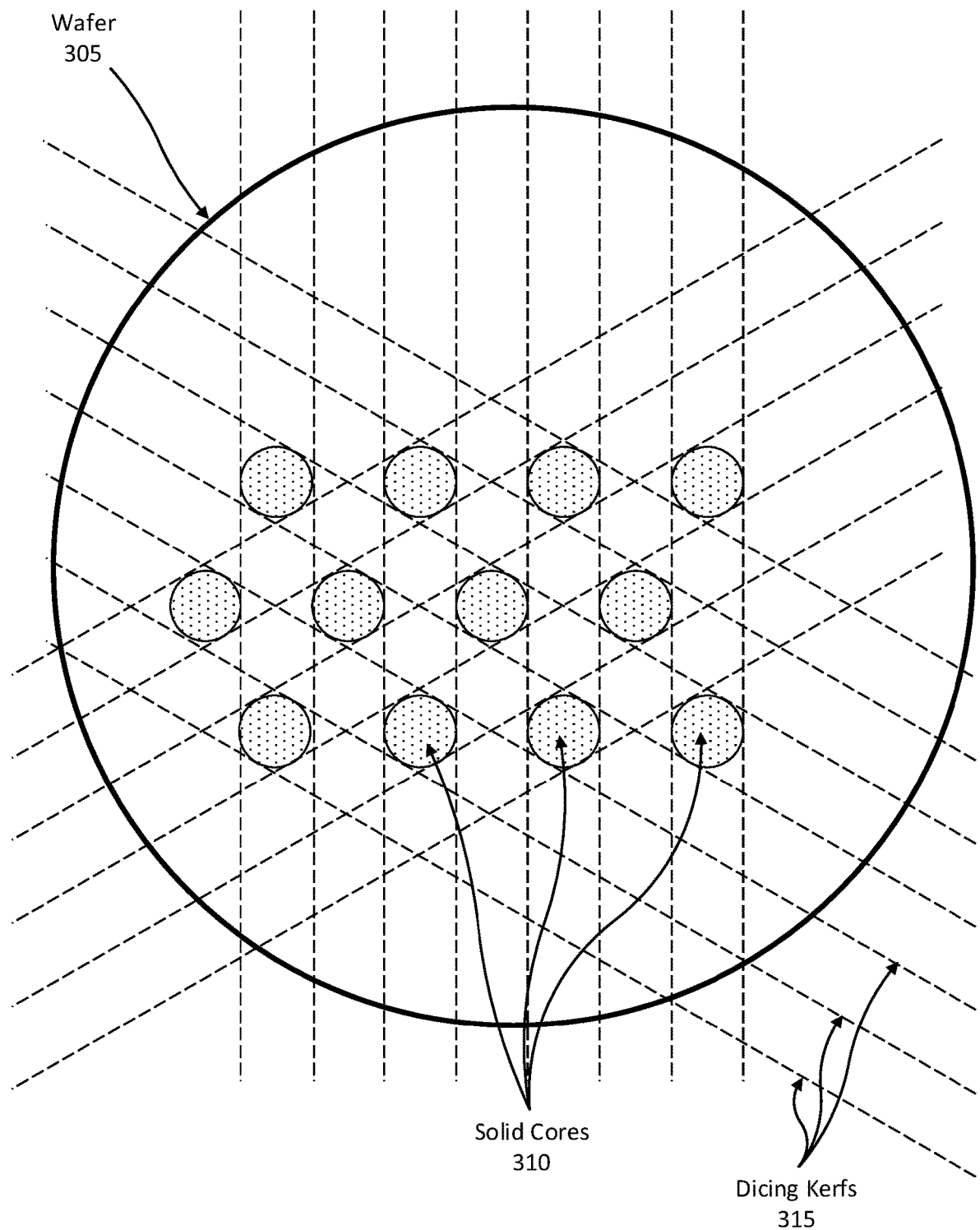
FIG. 3 shows a plan view of a wafer containing solid bodies used in femtoprojector optical systems.

FIG. 3 shows a plan view of a wafer containing solid, transparent bodies for use in femtoprojector optical systems. The wafer 305 is illustrated as a large circle, and the solid bodies (cores) 310 are illustrated as small filled circles within the large circle. The solid cores 310 and the wafer 305 are not drawn to scale. For example, many hundreds of solid cores 310 may be formed on a 100 mm diameter wafer rather than the dozen or so shown in FIG. 3. That is, the solid cores 310 may be more closely packed, and much smaller, than those illustrated. Each of the solid cores 310 may be further processed to create an optical system 246 of a femtoprojector 240 in a data/control subsystem 200.

The solid cores 310 may be made by any of several different techniques. For example, the wafer 305 may be a polymer wafer such that a wafer molding process may be employed. That is, the polymer wafer may be pressed into a mold comprising the profiles of the cores, such that the resulting cores 310 follow the shape of the mold. Other wafer molding techniques are also possible. Alternatively, the shape of the cores 310 may be made by diamond turning the wafer 305 on a lathe.

In another example, the cores 310 may be made by wafer-scale photolithography and etching steps. For example, gray scale photolithography may be used to create a surface profile for the cores 310. Other techniques including embossing, compression molding and/or UV curing photosensitive polymers may also be used to form surface profiles of the cores 310. Additive manufacturing or three-dimensional printing (e.g. via two-photon polymerization) techniques may also be employed.

Combinations of the techniques described above may be used to shape the solid cores 310. In one example, a lathe generates a mold using a diamond turning process, a wafer-molding process creates the cores 310 on a wafer 305, and photolithography and etching steps process the wafer to add additional features to the cores 310. Other examples are also possible.

The individual cores 310 may be singulated from the wafer 305 in a variety of manners. For example, a dicing saw may dice the wafer 305 to separate the cores 310. In FIG. 3, for example, a dicing saw employs straight cuts to separate individual cores 310 from the wafer 305. Dicing kerfs 315 of the dicing saw are indicated by dashed lines. In another example, the cores may be removed from the wafer using a snapping process. The snapping process is described in more detail below.

Figure 4:
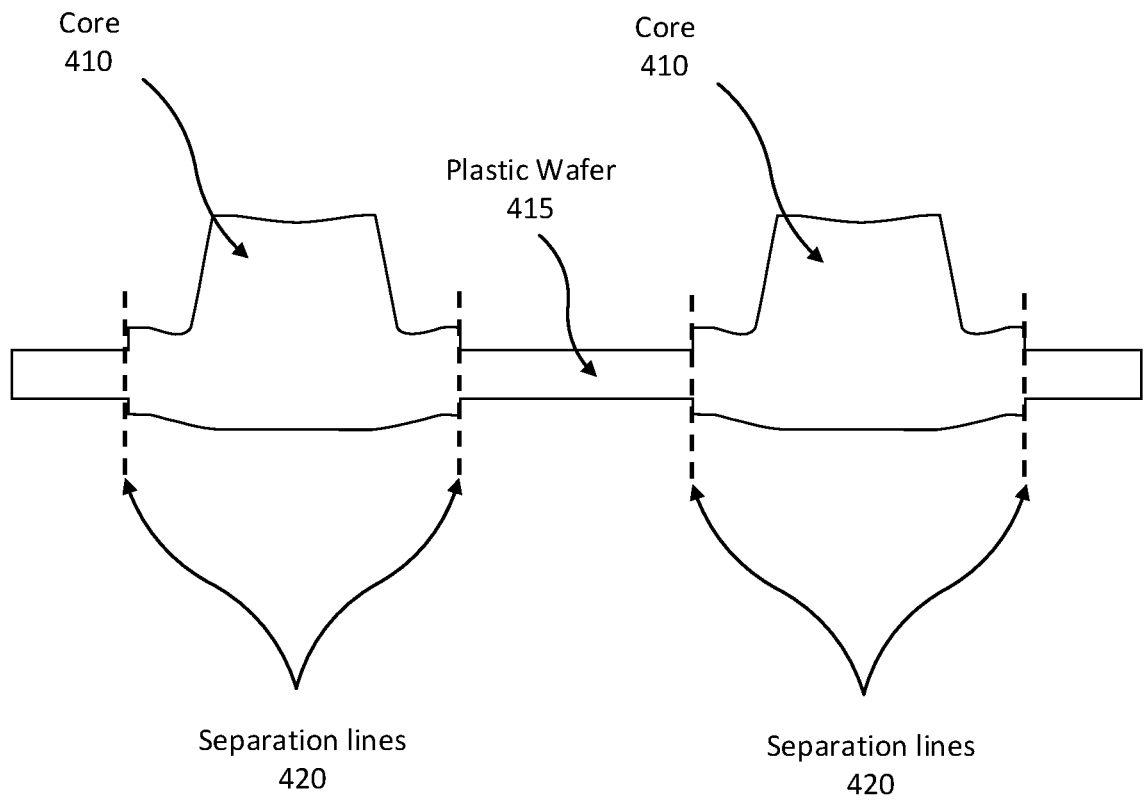
FIG. 4 shows a cross-sectional view of a wafer containing solid bodies used in femtoprojector optical systems.

Turning now to more detailed descriptions of the cores, FIG. 4 shows a cross-sectional view of a plastic wafer 415 containing multiple solid cores 410 for use in femtoprojector optical systems. FIG. 4 illustrates two cores 410, but there may be many more. Here, the shape of the cores 410 is formed by molding the plastic wafer 415, but the cores could also be cut into a plastic precursor as described above.

The cores 410 may be singulated from the plastic wafer 415 after they are formed. Here, the cores 410 may be cut from the plastic wafer 415 along separation lines 420. The separation lines 420 may be, for example, a dicing kerf (e.g., dicing kerf 315 in FIG. 3). A dicing saw may dice the plastic wafer 415 along the separation lines 420 to singulate the cores 410 from the wafer 415. Seen in a plan view, straight cuts may create cores 410 with polygonal outlines (e.g., dicing kerfs 315 in FIG. 3), but curved cuts may create cylindrically shaped cores 410.

Figure 5:
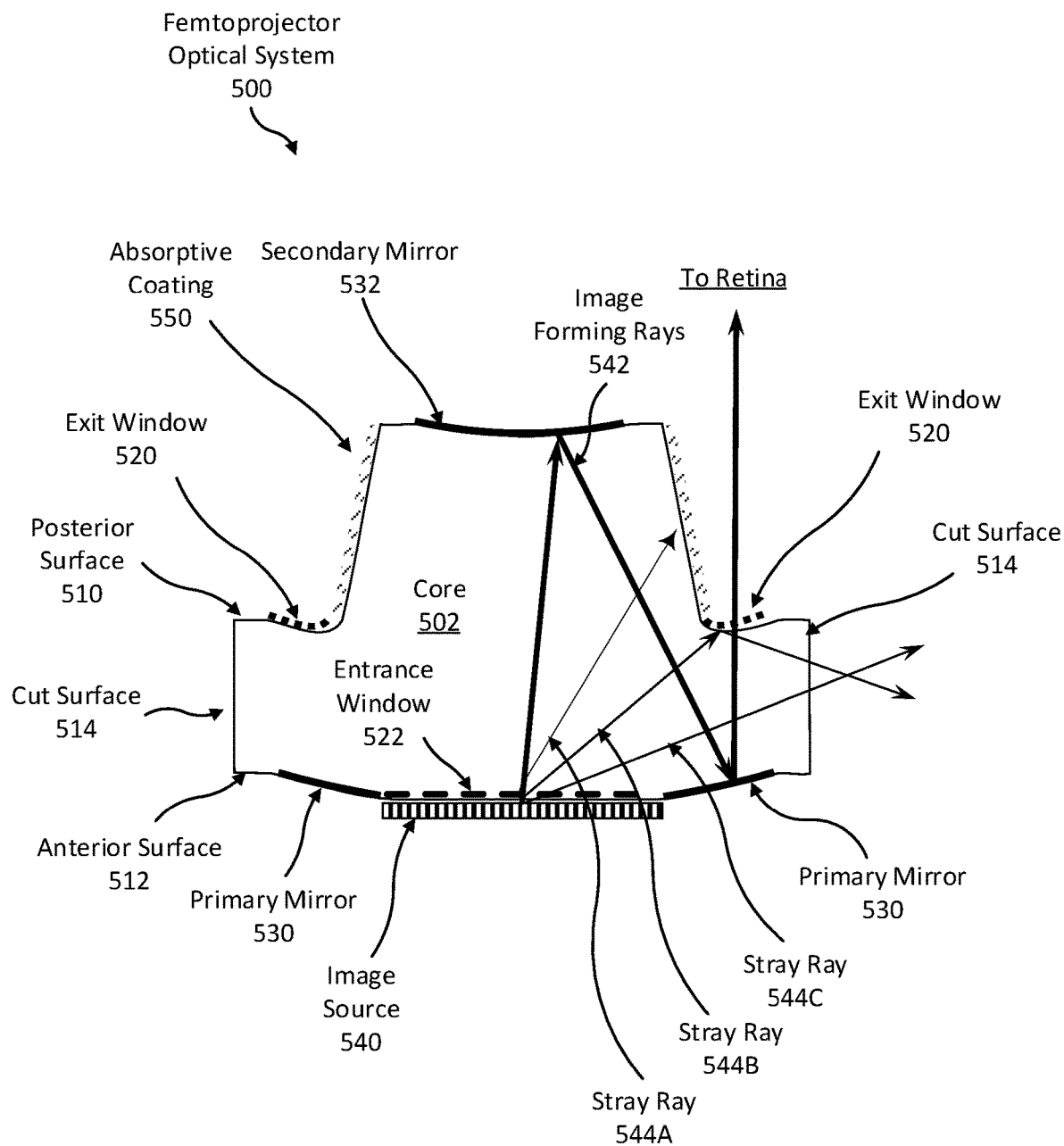
FIG. 5 shows a cross-sectional view of one embodiment of a femtoprojector optical system.

FIG. 5 shows a cross-sectional view of a femtoprojector optical system 500. The system 500 uses a solid transparent body 502 that may be made from plastic, glass or other transparent materials, such as described previously. Some examples designs of optical systems are described in U.S. patent application Ser. No. 16/034,761, "Advanced Optical Designs for Eye-Mounted Imaging Systems,"; and U.S. Pat. No. 10,353,204, "Femtoprojector Optical Systems,"; which are all incorporated by reference in their entireties.

The shape of the core 502 includes a posterior surface 510 and an anterior surface 512. The posterior surface 510 faces towards the user's eye, and the anterior surface 512 faces away from the user's eye. As illustrated, the posterior surface 510 includes an annular exit window 520. The annular exit window is a portion of the posterior surface 510 through which light may exit the optical system 500 towards the user's retina. The portion of the posterior surface 510 forming the exit window 520 is represented by a dotted line. The anterior surface 512 includes an entrance window 522 through which light may enter the optical system 500. The portion of the anterior surface 512 forming the entrance window 522 is represented by a dashed line. The system 500 also includes a cut surface 514.

The image source 540 for the optical system may be an ultra-dense micro LED array. The image source 540 generates light that enters the optical system 500 through the entrance window 522. Mirrors 532, 530 reflect the light rays from the entrance window 522 towards the exit window 520. The mirrors may also magnify the image from the source 540. The mirrors may be positioned on the anterior surface 512 and/or posterior surface 510 of the solid core. In FIG. 5, a central secondary mirror 532 is positioned on the posterior surface 510 and an annular primary mirror 530 is positioned on the anterior surface 512. The secondary mirror 532 faces the image source 540, and the primary mirror 530 faces the secondary mirror 532. The secondary mirror 532 is convex and the primary mirror 530 is concave. One or both may be aspheric. The mirrors may be formed by coating the surfaces 510, 512 of the core 502 with a reflective material.

Light rays entering the core 502 of the optical system include image-forming rays 542 and stray rays 544. Image-forming rays 542 projected on a user's retina and generate an image perceived by the user. To illustrate, image-forming rays 542 enter the core 502 via the entrance window 522. The image-forming rays 542 are first reflected by the secondary mirror 532 and then the primary mirror 530 before exiting the core 502 through the exit window 520. The image-forming rays 542 then form an image on the user's retina.

Stray rays 544 may also enter the core 502 via the entrance window 522. Stray rays 544 are rays that would not form an image on the user's retina. The optical system 500 is designed to control stray rays 544 and to prevent stray rays from reaching the user's retina. In FIG. 5, some stray rays 544A are absorbed by an absorptive coating 550. An absorptive coating 550 may be created by depositing an absorbing material on a surface of the core 502. Here, the absorptive coating 550 is deposited on the posterior surface 510 and extends from the exit window 520 towards the secondary mirror 532 to form a three-dimensional obscuration. Absorbing materials may include carbon, roughened or etched nickel ("nickel black"), black chrome, Vantablack (Surrey NanoSystems, Newhaven, UK), or black indium-tin oxide. Absorptive coatings in the figures are all illustrated with a similar hatch pattern, and may also be on other surfaces.

Stray rays 544B reflect off the exit window 520 and exit the core 502 through the cut surface 514. Stray rays 544C directly exit the core 502 through the cut surface 514. Other stray rays may also exit through the cut surface 514 by taking other optical paths, although they are not shown. For example, a stray ray may be reflected off one or more mirrors before exiting through the cut surface 514. These stray rays 544B,544C may be controlled through the use of grooves, as shown in FIGS. 6-10.

Figure 6:
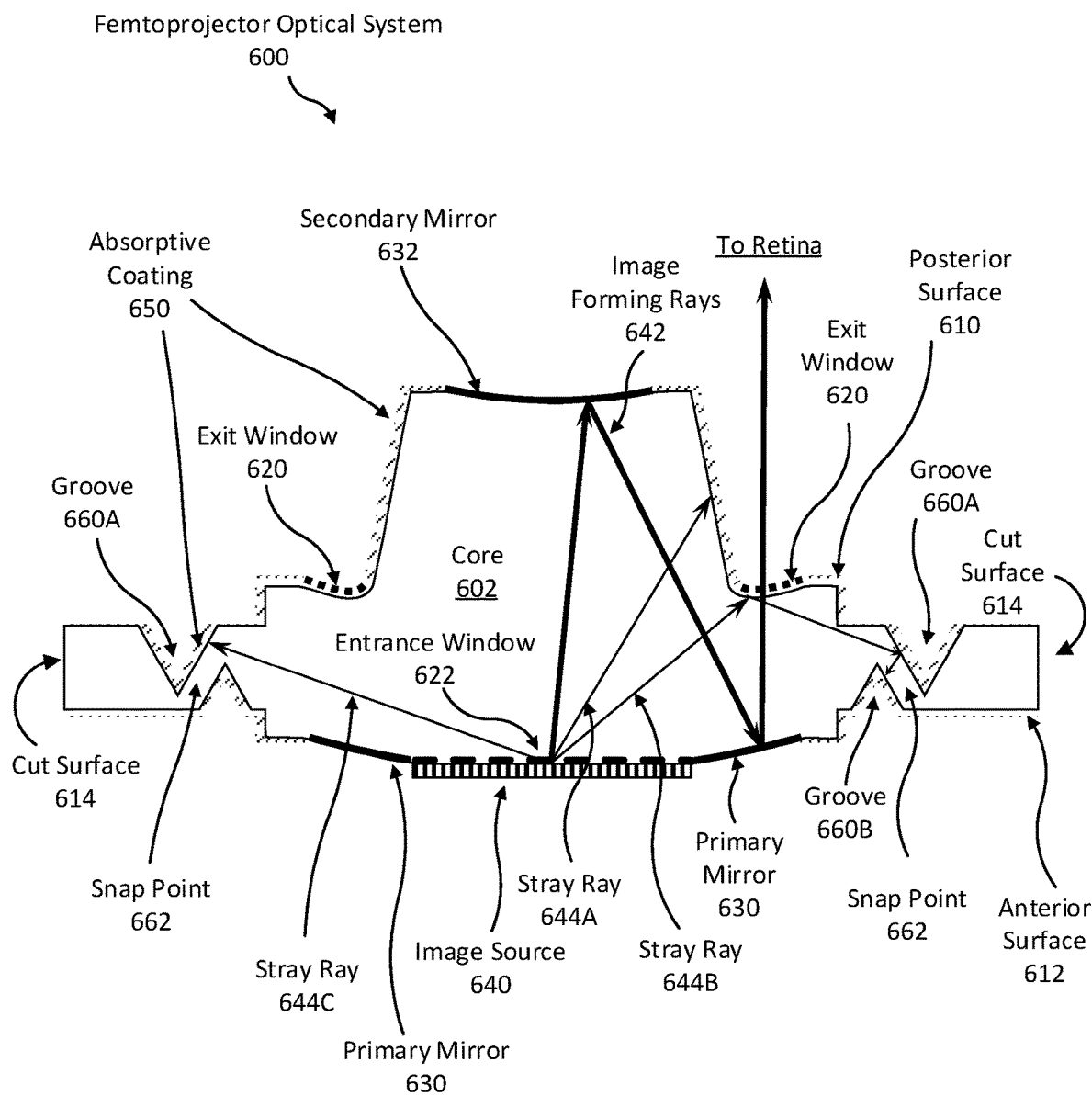
FIG. 6 shows a cross-sectional view of a femtoprojector optical system with grooves.

FIG. 6 shows a cross-sectional view of a femtoprojector optical system 600 with grooves. The system 600 in FIG. 6 is largely similar to the system 500 in FIG. 5. System 600, however, includes grooves 660 that prevent stray rays from exiting through the cut surface 614. The geometry of the grooves 660 function as a light trap for stray rays within the core 602. The light trap reduces the number of optical paths which exit the system 600 through the cut surface 614. To illustrate, stray ray 644B is reflected by the interfaces created by the grooves 660 and does not exit the system 600 through the cut surface 614. Because fewer stray rays exit the cut surface 614, the user wearing the contact lens experiences images with better contrast.

In this example, the transparent body of the optical system includes two grooves 660A and 660B. Groove 660A is on the posterior surface 610 and groove 660B is on the anterior surface 612. Both grooves are laterally positioned outside the optical paths of the image-forming rays 642. For example, as shown, both grooves are laterally located outside the exit window 620 (i.e., farther away from the central axis of the optical system than the exit window 620).

In this example, the grooves 660A and 660B are formed by cutting into the plastic body 602. As a result, the grooves have a triangular cross section that prevents stray rays from leaving the body 602. Here, the deepest point of each groove are offset from one another such that the first groove 660A is nearer the center of the system 600 than the second groove 660B. Other shapes and positions of grooves are also possible.

The grooves 660 also create a snap point 662. A snap point 662 is a thinned section of body 602 which breaks in a controlled fashion. When mechanical pressure is applied to the wafer, it breaks at the snap point 662 and releases the core 602. Snap points 662, or snap lines, may be created at locations on the body 602 by forming one or more grooves that leave a small fraction of the wafer thickness in a small area. For example, as illustrated, the proximity and depth of groove 660A and groove 660B create a small area of body 602 between them that is breakable via mechanical stress, i.e., a snap point 662. In this example, the combined depth of the grooves is greater than the thickness of body 602 at the location of the grooves on the body 602.

If the snap point 662 is used to separate the body 602 from a wafer, then there will be no cut surface 614 as shown in FIG. 6 because the body 602 will end at the snap point 662. However, the principles described above regarding the operation of grooves 660 still apply. For convenience, as in FIG. 6, many of the figures will show both a cut surface and a snap point, with the understanding that both features may not be present in any one particular optical system.

Grooves may also be coated with an absorptive coating 650 that absorb stray rays. For example, stray ray 644C is absorbed by an absorptive coating on the groove 660A. The absorptive coating 650 may be applied at the wafer level, before separating the individual cores 602.

Figure 7:
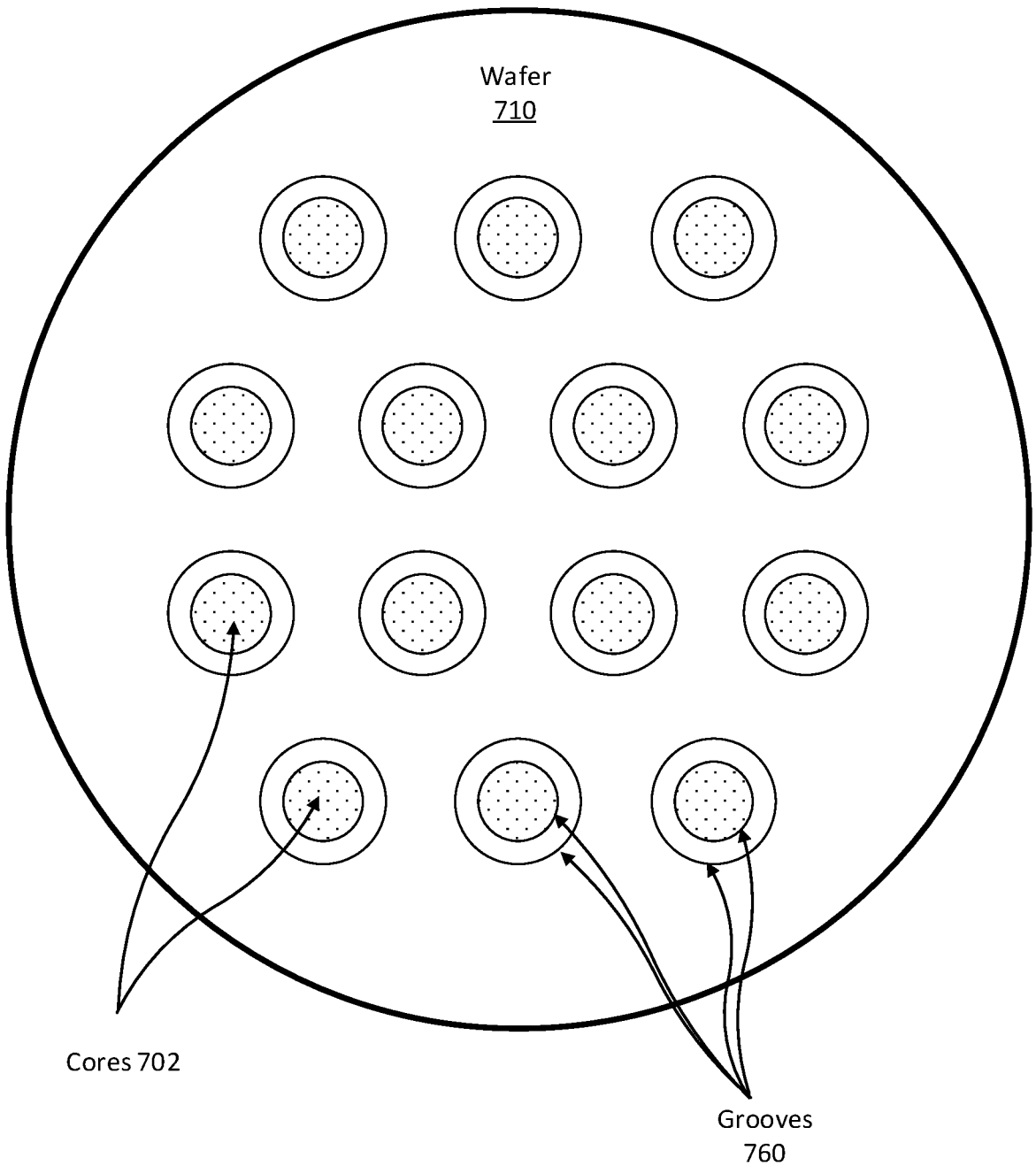
FIG. 7 shows a plan view of a wafer containing solid bodies used in femtoprojector optical systems, with each solid body surrounded by a groove.

FIG. 7 shows a plan view of a wafer 710 containing multiple cores 702. Each such core 702 has one or more grooves 760 that circumscribe the core. The grooves may be similar to those illustrated in FIG. 6. The grooves may be circular as shown in FIG. 7, or they may be formed from intersecting lines (polygonal grooves) similar to dicing kerfs 315 in FIG. 3. Additionally, rather than a groove being continuous, it may be segmented in some fashion. For example, the illustrated grooves may not fully encircle the cores 702, but may have one or more breaks within the illustrated lines.

As described above, the grooves 760 may be coated with an absorptive coating (e.g., absorptive coating 550, 650) to block stray rays from exiting the cores 702. Absorptive coatings may be applied to the optics when they are in wafer form, and, in an embodiment, no further coatings are necessary after the optics are separated into individual cores 702. The grooves 750 may also form snap points (e.g., snap point 662) or snap lines which permit individual cores 702 to be separated from the wafer 710 by controlled snapping or breaking.

Figure 8:
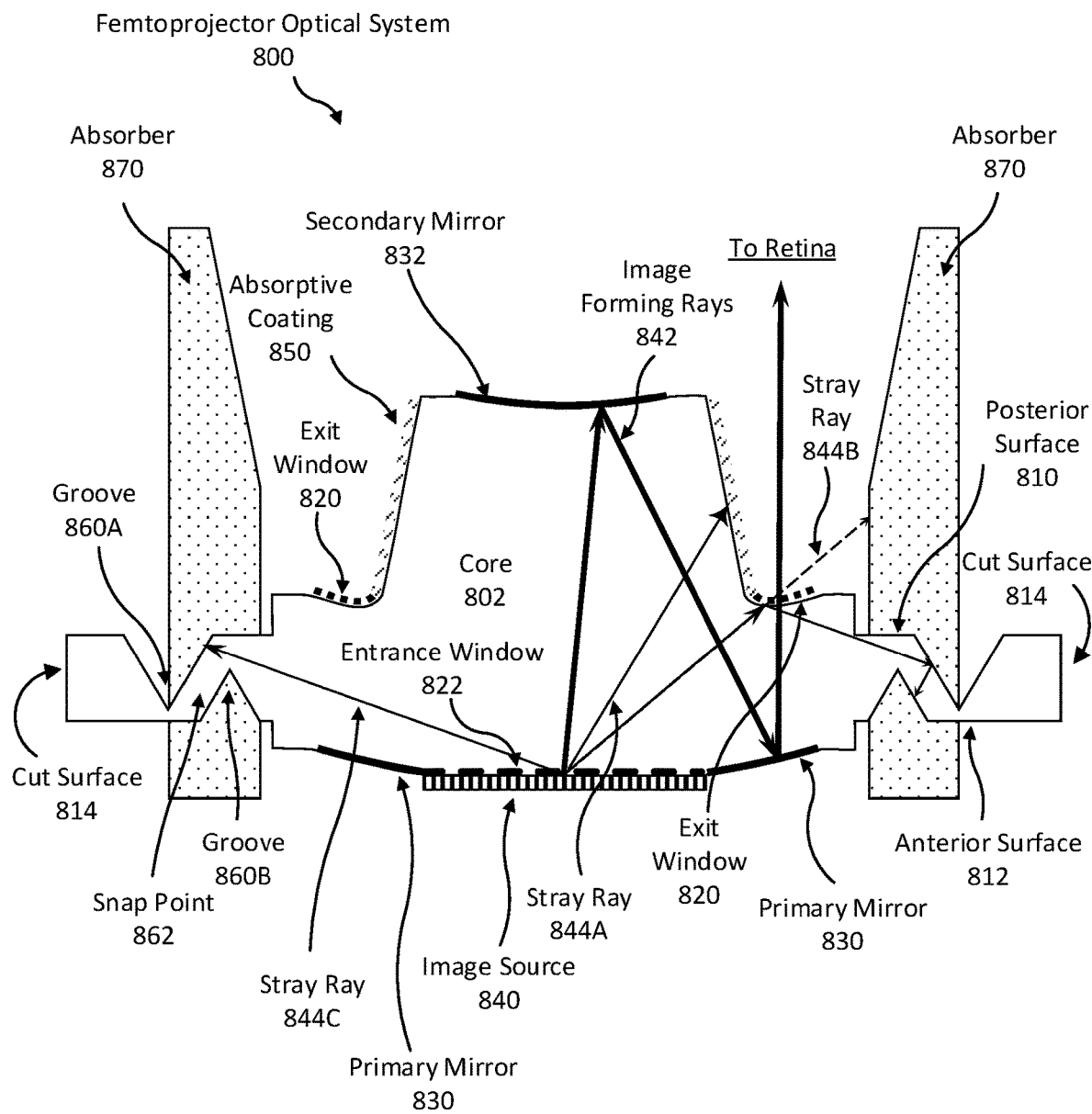
FIG. 8 shows a cross-sectional view of the a femtoprojector optical system including an absorber.

FIG. 8 shows a cross-sectional view of a femtoprojector optical system 800 including an external absorber 870. The system 800 is largely similar to system 600 shown in FIG. 6. System 800, however, includes an absorber 870 that surrounds the optical structure. The absorber 870 forms a skirt which extends away from both the posterior surface 810 and anterior surface 812. As illustrated, the absorber 870 is seated in the grooves. That is, the absorber 870 and the grooves are configured such that the absorber 870 is easily affixed within a groove when attached to the system 800. The absorber 870 may absorb stray rays that are incident at the interface where the absorber 870 is affixed to the system 800 (e.g., stray ray 844C). In an embodiment, the absorber 870 is affixed with glue while the system 800 remains attached to a wafer, but could be attached after the system 800 is separated from the wafer. The absorber 870 may be made on a separate wafer and subsequently attached (via pick-and-place and glue) to the system 800.

The absorber 870 acts as an external light baffle. The absorber 870 absorbs and/or attenuates stray light rays that exit the system 800 through the exit window 820. For example, a portion of stray ray 844B which exits through the exit window 820 is absorbed by the absorber 870. The absorber 870 may be constructed from, for example, black acrylonitrile butadiene styrene (ABS) or another black plastic, anodized aluminum, or a rigid material that has been coated with a black coating.

Figure 9:
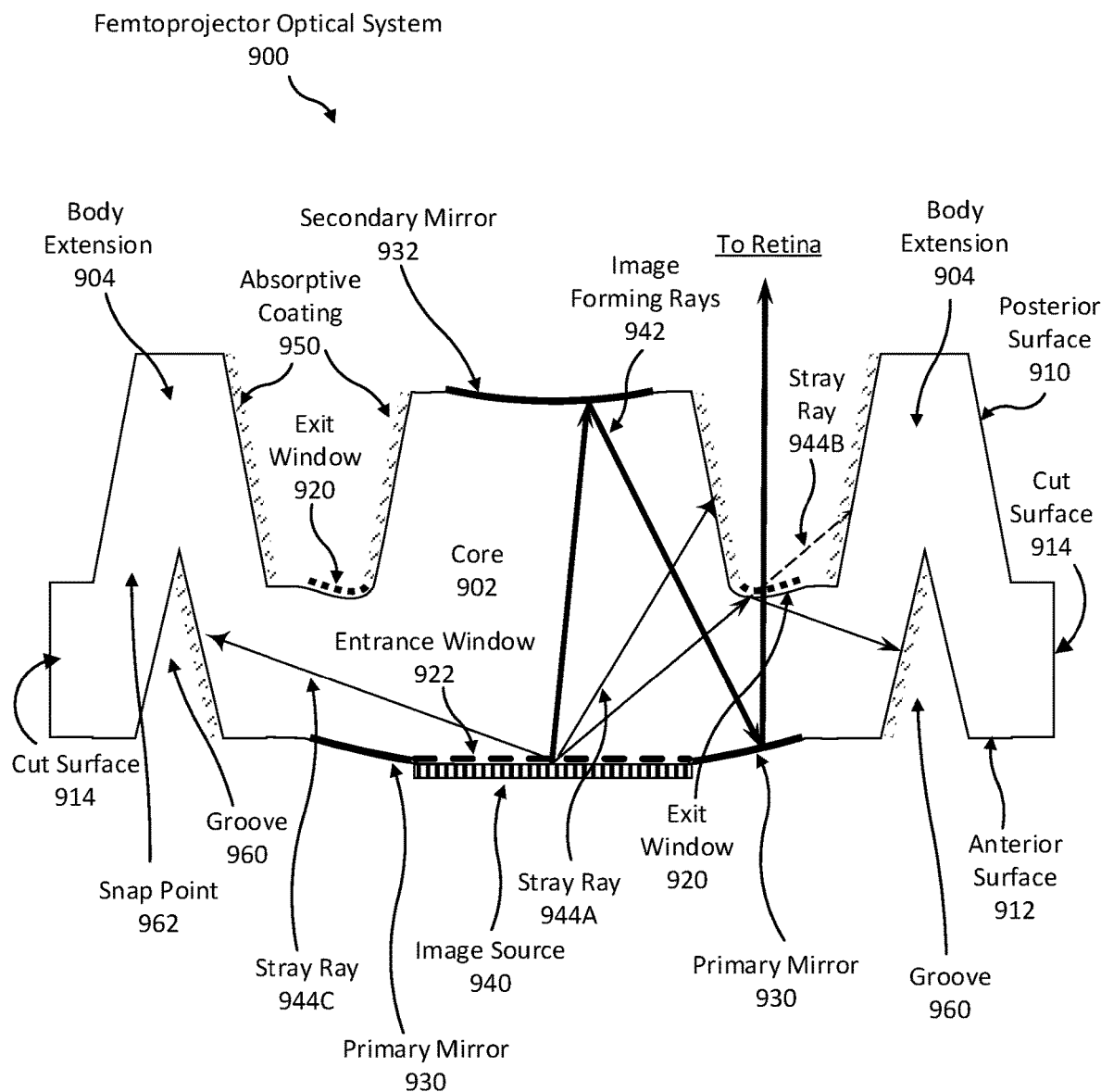
FIG. 9 shows a cross-sectional view of a femtoprojector optical system including a body extension.

FIG. 9 shows a cross-sectional view of a femtoprojector optical system 900 including a body extension. The system 900 shown in FIG. 9 is largely similar to systems 600 and 800 in FIGS. 6 and 8. System 900, however, includes a light baffle that is not an affixed absorber. Instead, the body 902 is fashioned such that a portion of the posterior surface 910 extends away from the exit window 920 like the absorber 870 of FIG. 8. This portion of the body is body extension 904. The surface of the body extension 904 adjacent to the exit window 920 is coated with an absorptive coating 950 such that it absorbs stray rays that impinge on the surface. For example, a portion of stray ray 944B exiting through exit window 920 is absorbed by the absorptive coating 950 on the body extension 904.

Additionally, system 900 includes a single groove 960 rather than two grooves. The groove 960 is on the anterior surface 912 of the body extension 904. Even though there is only one, the groove 960 still functions as a light trap for stray rays in the system 900. For example, here, one or more surfaces of the groove 960 may be coated with an absorptive coating 950 to absorb stray rays. In illustration, stray ray 944C is absorbed by an absorptive coating 950 on the groove 960. The groove 960 may also create a snap point 962 in the body 902 or body extension 904. Because of the body extension, the groove 960 is deeper than the height of the cut surface 914.

Figure 10:
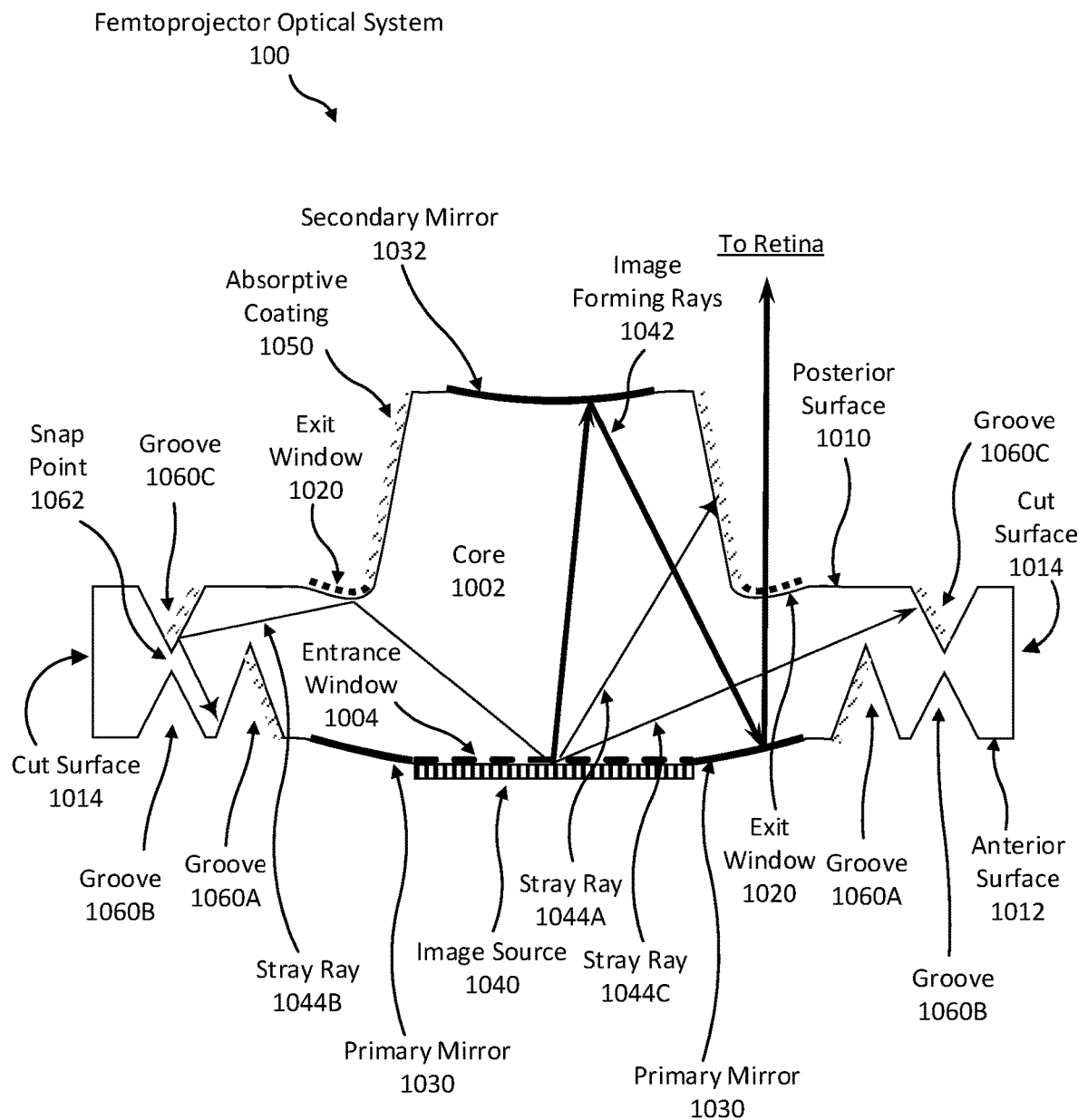
FIG. 10 shows a cross-sectional view of a femtoprojector optical system including three grooves.

FIG. 10 shows a cross-sectional view of a femtoprojector optical system 1000 including three grooves. The system 1000 shown in FIG. 10 is largely similar to systems 600, 800, and 900 in FIGS. 6, 8, and 9, respectively. System 1000, however, includes three grooves 1060 instead of only one or two grooves. The three grooves include a single groove 1060A on the anterior surface 1012, and a pair of opposing grooves 1060B and 1060C. The grooves are opposing because the floors of each groove are opposite to each other. In other words, the grooves 1060B and 1060C are at the same lateral location on the body 1002, but on opposing surfaces. The paired grooves form a snap point 1062 in the body 1002 between their floors.

The combination of grooves functions as a light trap for stray rays. For example, here, one or more surfaces of the grooves may be coated with an absorptive coating 1050 to absorb stray rays. In illustration, stray ray 1044C is absorbed by an absorptive coating 1050 on groove 1060C. Additionally, the geometry of the grooves blocks some stray rays from exiting the system via the cut surface 1014. For example, stray ray 1044B is blocked from exiting through the cut surface 1014.

The figures above illustrate various examples of femtoprojector optical systems that include one, two, and three grooves. However, other number of grooves may also be used. For example, a system could include five or ten grooves. Further, the grooves may be in positions other than those shown here. For example, a system could include both the opposing grooves of FIG. 10 and the offset grooves of FIG. 6. Many other examples are possible.

Additionally, certain surfaces are illustrated with an absorptive coating but additional, or other, surfaces may include an absorptive coating. For example, every surface, some surfaces, or no surfaces, may include an absorptive coating.

Various approaches may be used to keep entrance windows and/or exit windows clear of absorptive coatings. Keeping the surfaces clear of absorptive coatings improves the transmission of image-forming rays towards the retina. In one approach, the absorptive coating is patterned similar to photoresist. The absorptive coating is applied, exposed to patterned UV light, and then developed with a solvent that removes either the exposed (positive resist) or unexposed (negative resist) black material. This approach may be used with an optically-thin absorptive coating such that the UV light penetrates the coating. This approach may involve stacking multiple, thin black layers. Further, a reflective layer may be deposited over the black layer(s) to make it (them) more opaque.

Another approach uses a shadow mask to protect the entrance and exit surfaces. A thin metal sheet is aligned close to the wafer with holes in the metal located just above the parts of the wafer to be coated. This approach uses a directional coating technique in order to confine the coating only to those areas of the wafer directly beneath the holes in the shadow mask.

Another approach uses patterned etching. The absorptive coating is first applied everywhere. Next, a photoresist is patterned on top of the coating, with resist protecting areas where the coating should remain, and no resist over the areas where the coating is to be removed (e.g. the entrance and exit surfaces). A solvent is then used that dissolves the absorptive coating but does not dissolve the photoresist or the optical material of the femtoprojector.

Another approach uses liftoff patterning. A photoresist is first applied and patterned so that resist remains only over the entrance and exit surfaces. Then an absorptive coating is applied everywhere using a directional process that does not allow the absorptive coating to stick to the sidewalls of the photoresist. The absorptive coating is thinner than the photoresist. Then the photo-resist is dissolved under the absorptive coating, "lifting-off" the absorptive coating from the entrance and exit surfaces.

Another approach, appropriate for the entrance surface, is to coat the entrance surface with an absorbing coating along with the rest of the wafer. Next, the wafer is lapped and/or polished to remove the absorptive coating from the entrance surface since that is also the highest surface on that side of the wafer.

Femtoprojector optics may be made in bulk, parallel batches with wafer techniques. Many hundreds or thousands of optical systems can be made simultaneously on a wafer. Since wafers are easier to handle than individual optics, reflective and absorbtive coatings may be applied before individual optics are separated from a wafer. Grooves surrounding the optics may control stray light. They may also form snap points or snap lines that facilitate removing optics from a wafer.

Although the detailed description contains many specifics, these should not be construed as limiting the scope of the invention but merely as illustrating different examples. It should be appreciated that the scope of the disclosure includes other embodiments not discussed in detail above. For example, the optical systems described above may be used in reverse as imagers rather than as displays. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

The invention claimed is:

1. An optical system for projecting an image produced by an image source to a retina of a user's eye when an eye-mounted display containing the optical system is mounted on the user's eye, the optical system comprising:
   a transparent, solid body having an anterior surface and a posterior surface; wherein the anterior surface includes a central entrance window to receive light from the image source, and the posterior surface includes an annular exit window through which light exits the solid body towards the user's retina;
   a set of mirrors positioned on the anterior and posterior surfaces, the mirrors reflecting image-forming light from the entrance window through the solid body to the exit window, wherein the solid body also has an annular groove in one of the surfaces and the groove is laterally located outside of an optical path of the image-forming light; and
   wherein the posterior surface also forms an external side light baffle extending from the annular exit window away from the anterior surface.

2. The optical system of claim 1, wherein the groove prevents stray light from exiting the solid body.

3. The optical system of claim 2, wherein a geometry of the groove constrains optical paths for stray light to exit through an edge of the solid body.

4. The optical system of claim 2, wherein a geometry of the groove creates a light trap that reduces stray light from exiting the solid body.

5. The optical system of claim 2, wherein the groove is coated with an absorptive coating that absorbs stray light.

6. The optical system of claim 1, wherein the solid body is thinnest at a location of the groove.

7. The optical system of claim 1, wherein the annular groove forms a circular annulus groove or a polygon annulus groove.

8. The optical system of claim 1, wherein the annular groove does not circumscribe a full 360 degrees.

9. The optical system of claim 1, wherein the solid body has a second annular groove also laterally located outside of the optical path of the image-forming light, one of the annular grooves is in the anterior surface, and the other annular groove is in the posterior surface.

10. The optical system of claim 9, wherein floors of the two annular grooves are laterally offset from each other, and a sum of the depths of the two annular grooves is greater than a thickness of the solid body at a location of the grooves.

11. The optical system of claim 9, wherein floors of the two annular grooves are directly opposite each other.

12. The optical system of claim 1, wherein the solid body has a second annular groove also laterally located outside of an optical path of the image-forming light, and both annular grooves are in the same surface.

13. The optical system of claim 1, wherein the solid body has two additional annular grooves also laterally located outside of the optical path of the image-forming light.

14. An optical system for projecting an image produced by an image source to a retina of a user's eye when an eye-mounted display containing the optical system is mounted on the user's eye, the optical system comprising:

a transparent, solid body having an anterior surface and a posterior surface; wherein the anterior surface includes a central entrance window to receive light from the image source, and the posterior surface includes an annular exit window through which light exits the solid body towards the user's retina;

a set of mirrors positioned on the anterior and posterior surfaces, the mirrors reflecting image-forming light from the entrance window through the solid body to the exit window, wherein the solid body also has an annular groove on the posterior surface and the groove is laterally located outside of an optical path of the image-forming light; and wherein the solid body is not more than 1 mm thick.

15. The optical system of claim 1, wherein the set of mirrors includes a central mirror positioned on the posterior surface and an annular mirror positioned on the anterior surface; and the optical system further comprises:

a three-dimensional obscuration extending from the central mirror towards the annular mirror.

16. An optical system for projecting an image produced by an image source to a retina of a user's eye when an eye-mounted display containing the optical system is mounted on the user's eye, the optical system comprising:

a transparent, solid body having an anterior surface and a posterior surface; wherein the anterior surface includes a central entrance window to receive light from the image source, and the posterior surface includes an annular exit window through which light exits the solid body towards the user's retina;

a set of mirrors positioned on the anterior and posterior surfaces, the mirrors reflecting image-forming light from the entrance window through the solid body to the exit window, wherein the solid body also has an annular groove on the posterior surface and the groove is laterally located outside of an optical path of the image-forming light; and an external side light baffle seated in the groove, the external side light baffle extending from the annular exit window away from the anterior surface.

17. A wafer-level optic comprising a single mass of transparent, solid material formed into an array of unseparated transparent, solid bodies; each solid body having an anterior surface and a posterior surface; wherein:

the anterior surface includes a central entrance window and an annular region for an annular mirror;

the posterior surface includes an annular exit window and a central region for a central mirror;

the posterior surface comprises an absorptive coating on a region of the posterior surface extending from the central mirror towards the annular mirror;

when the solid body is incorporated into an optical system, light from an image source enters the solid body through the entrance window, is reflected through the solid body by the mirrors and exits the solid body through the exit window towards a user's retina; and the solid body also has an annular groove in one of the surfaces and the groove is laterally located outside of an optical path of the light reflected through the solid body.

18. The wafer-level optic of claim 17 further comprising a first reflective coating on the annular region to form the annular mirror, and a second reflective coating on the central region to form the central mirror.

19. The wafer-level optic of claim 17 further comprising an absorptive coating on the groove, wherein the absorptive coating absorbs stray light from the image source.

20. The wafer-level optic of claim 17 wherein the grooves create snap lines for separating the transparent, solid bodies.

* * * * *